(12) United States Patent
Schubert et al.

(10) Patent No.: US 11,718,317 B2
(45) Date of Patent: Aug. 8, 2023

(54) VEHICLE LOCATION CORRECTION USING ROADSIDE DEVICES

(71) Applicant: Ford Global Technologies, LLC, Dearborn, MI (US)

(72) Inventors: Jochen Schubert, Westland, MI (US); Timothy Thivierge, Carleton, MI (US); Vivekanandh Elangovan, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 237 days.

(21) Appl. No.: 17/072,202

(22) Filed: Oct. 16, 2020

(65) Prior Publication Data
US 2022/0119001 A1 Apr. 21, 2022

(51) Int. Cl.
| | |
|---|---|
| *B60W 60/00* | (2020.01) |
| *H04W 4/44* | (2018.01) |
| *H04L 9/00* | (2022.01) |
| *H04L 9/32* | (2006.01) |
| *G01S 11/04* | (2006.01) |
| *G01S 13/02* | (2006.01) |
| *H04W 12/069* | (2021.01) |

(52) U.S. Cl.
CPC .......... *B60W 60/001* (2020.02); *G01S 11/04* (2013.01); *G01S 13/0209* (2013.01); *H04L 9/006* (2013.01); *H04L 9/3268* (2013.01); *H04W 4/44* (2018.02); *H04W 12/069* (2021.01); *B60W 2420/52* (2013.01); *B60W 2556/45* (2020.02)

(58) Field of Classification Search
CPC ... H04W 12/069; G01C 21/165; G01C 15/04; G01C 21/3602; G01C 21/36; G01S 7/003; G01S 19/45; G01S 19/14; G01S 19/48; G01S 13/931; G05D 1/0274; F16M 13/022; F16M 11/2014; B60W 60/00
See application file for complete search history.

(56) References Cited

U.S. PATENT DOCUMENTS

| | | | |
|---|---|---|---|
| 8,467,968 B1* | 6/2013 | Dolinar ................ | G01C 15/04 |
| | | | 701/534 |
| 9,658,069 B2* | 5/2017 | Stahlin ................ | G01C 21/165 |
| (Continued) | | | |

FOREIGN PATENT DOCUMENTS

| | | |
|---|---|---|
| CN | 106443741 B | 5/2019 |
| CN | 109946648 A | 6/2019 |
| (Continued) | | |

*Primary Examiner* — Yuri Kan, P.E.
(74) *Attorney, Agent, or Firm* — Frank A. MacKenzie; Bejin Bieneman PLC

(57) ABSTRACT

A system comprises a computer including a processor and a memory. The memory storing instructions executable by the processor to cause the processor to detect a roadside device via at least one vehicle sensor of a plurality of vehicle sensors; determine a location of a vehicle based on a fixed location of the roadside device; determine a location correction adjustment, wherein the location correction adjustment comprises a difference between an assumed location of the vehicle and the determined location of the vehicle, wherein the assumed location is obtained from a navigation system of the vehicle; and adjust the assumed location based on the location correction adjustment.

16 Claims, 5 Drawing Sheets

(56) References Cited

U.S. PATENT DOCUMENTS

| | | | | |
|---|---|---|---|---|
| 2013/0184938 A1* | 7/2013 | Dolinar | ................ | F16M 13/022 |
| | | | | 348/149 |
| 2013/0190981 A1* | 7/2013 | Dolinar | ............. | F16M 11/2014 |
| | | | | 348/148 |
| 2016/0209511 A1* | 7/2016 | Dolinar | ................... | G01S 19/14 |
| 2017/0361726 A1* | 12/2017 | Widmer | ................. | G01S 19/45 |
| 2020/0319641 A1* | 10/2020 | Tsuda | ................... | G05D 1/0274 |
| 2020/0386895 A1* | 12/2020 | Lee | .................... | G01C 21/3602 |
| 2022/0026566 A1* | 1/2022 | Guo | ....................... | G01S 7/003 |

FOREIGN PATENT DOCUMENTS

| | | | | |
|---|---|---|---|---|
| CN | 109946731 A | 6/2019 | | |
| DE | 102015208621 B3 | 9/2018 | | |
| DE | 102018105258 A1 * | 9/2019 | ............ | G01S 19/48 |
| KR | 101755944 B1 | 7/2017 | | |

* cited by examiner

VEHICLE LOCATION CORRECTION USING ROADSIDE DEVICES

BACKGROUND

Vehicles can use sensors to collect data while operating, e.g., including radar, LIDAR, vision systems, infrared systems, and ultrasonic transducers. Vehicles can actuate the sensors to collect data while traveling on roads. Sensor data can be used for operating the vehicle. For example, sensor data can be indicative of objects relative to the vehicle.

DETAILED DESCRIPTION

Figure 1:
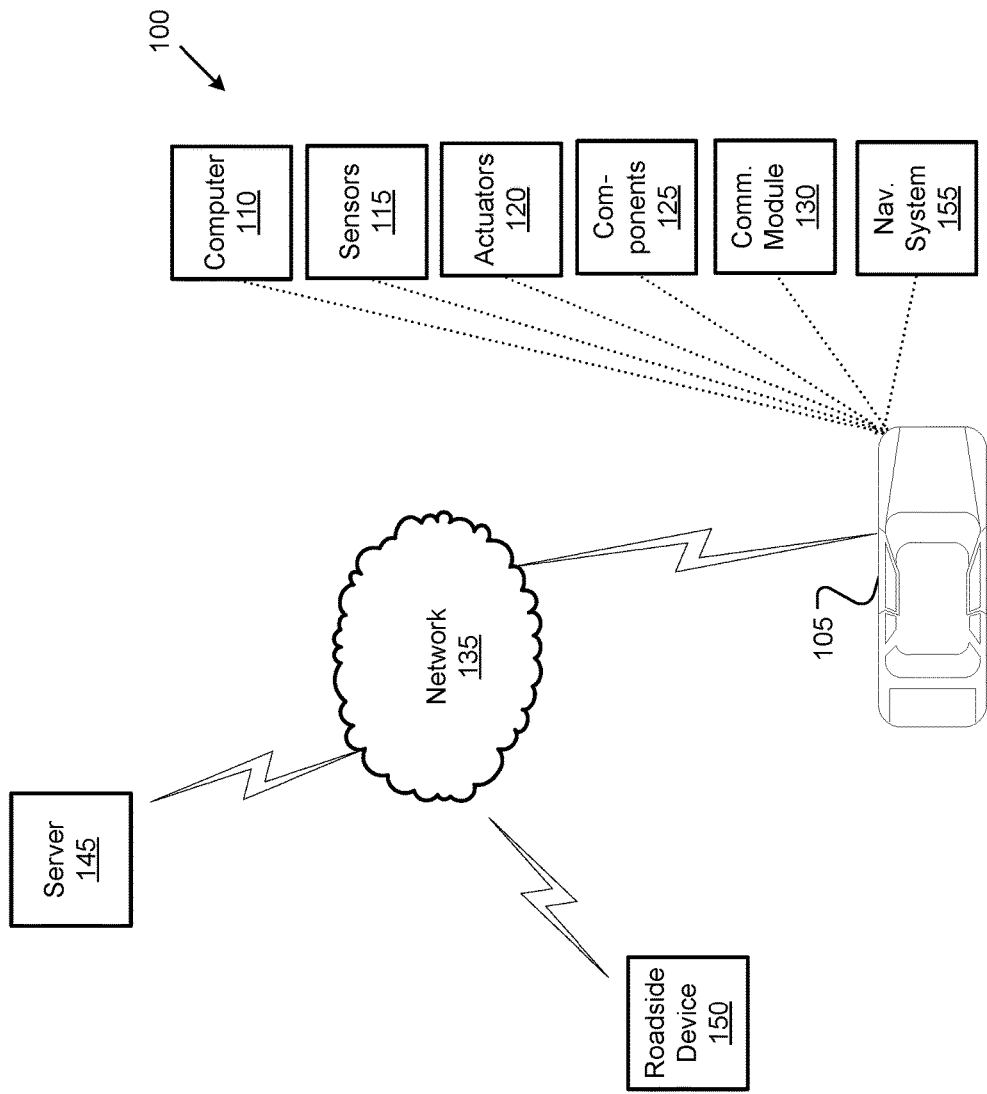
FIG. 1 is a diagram of an example system for generating a path recommendation based on a vehicle status.

A system comprises a computer including a processor and a memory. The memory stores instructions executable by the processor to cause the processor to detect a roadside device via at least one vehicle sensor of a plurality of vehicle sensors; determine a location of a vehicle based on a fixed location of the roadside device; determine a location correction adjustment, wherein the location correction adjustment comprises a difference between an assumed location of the vehicle and the determined location of the vehicle, wherein the assumed location is obtained from a navigation system of the vehicle; and adjust the assumed location based on the location correction adjustment.

In other features, the processor is further programmed to: alter a vehicle path of the vehicle based on the location correction adjustment.

In other features, the processor is further programmed to: actuate one or more vehicle actuators to alter the vehicle path.

In other features, the processor is further programmed to: calculate a distance between the roadside device and the at least one vehicle sensor by measuring a ultra-wideband (UWB) signal at least one vehicle sensor, wherein the UWB signal is transmitted from the roadside device.

In other features, the processor is further programmed to: calculate the distance between the roadside device and the at least one vehicle sensor based on at least one of an angle-of-arrival (AoA) measurement, an angle-of-departure (AoD) measurement, or a time-of-flight (ToF) measurement of the UWB signal.

In other features, the processor is further programmed to: determine the location of the vehicle by applying a triangulation model to the calculated distance between the roadside device and the at least one vehicle sensor.

In other features, the processor is further programmed to: determine a vehicle orientation relative to the roadside device; and determine the location of the vehicle based on the calculated distance with respect to the fixed location of the roadside device and the vehicle orientation.

In other features, the processor is further programmed to: authenticate the roadside device after detection of the roadside device.

In other features, the roadside device is authenticated based on a V2X certificate of the roadside device.

In other features, the processor is further programmed to: authenticate the V2X certificate via a public key infrastructure (PKI) protocol.

In other features, the processor is further programmed to: determine whether the V2X certificate of the roadside device is included in a certificate revocation list; and reject signals transmitted by the roadside device when the V2X certificate of the roadside device is included in the certificate revocation list.

In other features, the system further includes a server in communication with the processor, wherein the server is programmed to: determine that the roadside device is transmitting incorrect data based on a comparison of the determined location of the vehicle with ground truth data; and add the V2X certificate to the certificate revocation list based on the determination.

A method comprises: detecting, via computer, a roadside device via at least one vehicle sensor of a plurality of vehicle sensors; determining a location of a vehicle based on a fixed location of the roadside device; determining a location correction adjustment, wherein the location correction adjustment comprises a difference between an assumed location of the vehicle and determined location of the vehicle, wherein the assumed location is obtained from a navigation system of the vehicle; and adjusting the assumed location based on the location correction adjustment.

In other features, the method includes altering a vehicle path of the vehicle based on the location correction adjustment.

In other features, the method includes actuating one or more vehicle actuators to alter the vehicle path.

In other features, the method includes calculating a distance between the roadside device and the at least one vehicle sensor by measuring a ultra-wideband (UWB) signal at least one vehicle sensor, wherein the UWB signal is transmitted from the roadside device.

In other features, the method includes calculating the distance between the roadside device and the at least one vehicle sensor based on at least one of angle-of-arrival (AoA) measurement, an angle-of-departure (AoD) measurement, or a time-of-flight (ToF) measurement of the UWB signal.

In other features, the method includes determining the location of the vehicle by applying a triangulation model to the calculated distance between the roadside device and at least one vehicle sensor.

In other features, the method includes determining a vehicle orientation relative to the roadside device; and determining the location of the vehicle based on the calculated distance with respect to the fixed location of the roadside device and the vehicle orientation.

In other features, the method includes authenticating the roadside device after detection of the roadside device.

Some vehicles, such as autonomous vehicles, employ vehicle-to-vehicle (V2V) and vehicle-to-infrastructure (V2I) communications, collectively known as V2X, for communication purposes. For example, V2X communications include one or more communication networks in which vehicles and roadside devices are the communicating nodes that provide one another with information, such as safety warnings and traffic information. V2X communications allow vehicles to communicate with other vehicles, infrastructure, and/or pedestrians, using wireless communications technologies such as, but not limited to, cellular, Bluetooth®, IEEE 802.11, dedicated short range communications (DSRC), ultra-wideband (UWB), and/or wide area networks (WAN).

Satellite systems (e.g., the global positioning system or GPS) are typically the primary source for providing vehicle location data to vehicle navigation systems. In dense urban environments, tunnels, and/or covered parking structures, these satellite systems can be unreliable resulting in possible interfere with the vehicle navigation system.

Within Intelligent Transportation Systems (ITS), roadside devices may be located along one or more roadways to capture vehicle-generated traffic data and provide information, such as traffic advisories, from the infrastructure, e.g., roadside device, to vehicles to inform the driver and/or vehicle of safety, mobility, and/or environment-related conditions. In some instances, roadside devices are positioned within signalized intersections to provide information to the vehicles traveling proximate to the signalized intersection.

Accordingly, a vehicle can include one or more sensors that communicate with the roadside devices. In an example implementation, the vehicle and the roadside devices can include ultra-wideband (UWB) transceivers that transmit and receive UWB signals. As discussed herein, the vehicle can localize itself with respect to the roadside device and determine a location correction adjustment to provide to the vehicle's navigation system for compensation.

FIG. 1 is a block diagram of an example system 100 for determining a location correction adjustment. The system 100 includes a vehicle 105, which is a land vehicle such as a car, truck, etc. However, it is to be understood that the vehicle 105 may also comprise other types of vehicles, such as motorcycles, scooters, etc. The vehicle 105 includes a computer 110, vehicle sensors 115, actuators 120 to actuate various vehicle components 125, and a vehicle communications module 130. Via a communication network 135, the communications module 130 allows the computer 110 to communicate with a server 145. The system 100 also includes a roadside device 150, which can communicate with the server 145 and the vehicle 105 via the communication network 135.

The computer 110 includes a processor and a memory. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via the vehicle 105 communications module 130 as described further below, more than one processor, e.g., included in electronic controller units (ECUs) or the like included in the vehicle 105 for monitoring and/or controlling various vehicle components 125, e.g., a powertrain controller, a brake controller, a steering controller, etc. Further, the computer 110 may communicate, via the vehicle 105 communications module 130, with a navigation system 155 that uses the Global Position System (GPS). As an example, the computer 110 may request and receive location of the vehicle 105. The location may be in a known form, e.g., geo-coordinates (latitudinal and longitudinal coordinates).

The computer 110 is generally arranged for communications on the vehicle 105 communications module 130 and also with a vehicle 105 internal wired and/or wireless network, e.g., a bus or the like in the vehicle 105 such as a controller area network (CAN) or the like, and/or other wired and/or wireless mechanisms.

Via the vehicle 105 communications network, the computer 110 may transmit messages to various devices in the vehicle 105 and/or receive messages from the various devices, e.g., vehicle sensors 115, actuators 120, vehicle components 125, a human machine interface (HMI), etc. Alternatively or additionally, in cases where the computer 110 actually comprises a plurality of devices, the vehicle 105 communications network may be used for communications between devices represented as the computer 110 in this disclosure. Further, as mentioned below, various controllers and/or vehicle sensors 115 may provide data to the computer 110.

Vehicle sensors 115 may include a variety of devices such as are known to provide data to the computer 110. For example, the vehicle sensors 115 may include Light Detection and Ranging (LIDAR) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles 106), etc., relative to the location of the vehicle 105. The vehicle sensors 115 may further include camera sensor(s) 115, e.g. front view, side view, rear view, etc., providing images from a field of view inside and/or outside the vehicle 105.

The vehicle 105 actuators 120 are implemented via circuits, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications to another vehicle, to (typically via the communication network 135) a remote server 145. The module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 include cellular, Bluetooth®, IEEE 802.11, ultra-wideband (UWB), dedicated short range communications (DSRC), and/or wide area networks (WAN), including the Internet, providing data communication services.

The communication network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, UWB, vehicle-to-vehicle (V2V) such as Dedicated Short-Range Communications (DSRC), etc.), local area networks (LAN) and/or wide area networks (WAN), including the Internet, providing data communication services.

A computer 110 can receive and analyze data from sensors 115 substantially continuously, periodically, and/or when instructed by a server 145, etc. Further, object classification or identification techniques can be used, e.g., in a computer 110 based on LIDAR sensor 115, camera sensor 115, etc., data, to identify a type of object, e.g., vehicle, person, rock, pothole, bicycle, motorcycle, etc., as well as physical features of objects.

The roadside device 150 can be located along a roadside and/or in a roadside intersection and can communicate with one or more vehicles 105 traversing the roadside or located within the roadside intersection. The roadside device 150 can communicate with the vehicle 105 via the communication network 135. As discussed in greater detail herein, the vehicle 105 can communicate with the roadside device 150 and determine a location correction adjustment for the navigation system 155 of the vehicle 105.

Figure 2:
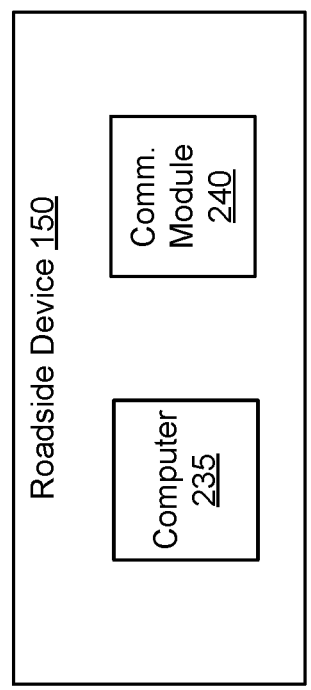
FIG. 2 is a diagram of an example roadside device within the system illustrated in FIG. 1.

FIG. 2 is a block diagram of an example roadside device 150. The roadside device 150 includes a computer 235 and a communications module 240. The computer 235 includes a processor and a memory. The memory includes one or more computer-readable media, and stores instructions executable by the computer 235 for performing various operations, including as disclosed herein. The communications module 240 allows the computer 235 to communicate, typically according to conventional wireless techniques, with other devices, such as the vehicle 105, other vehicles, the server 145, and/or other roadside devices 150.

Figure 3:
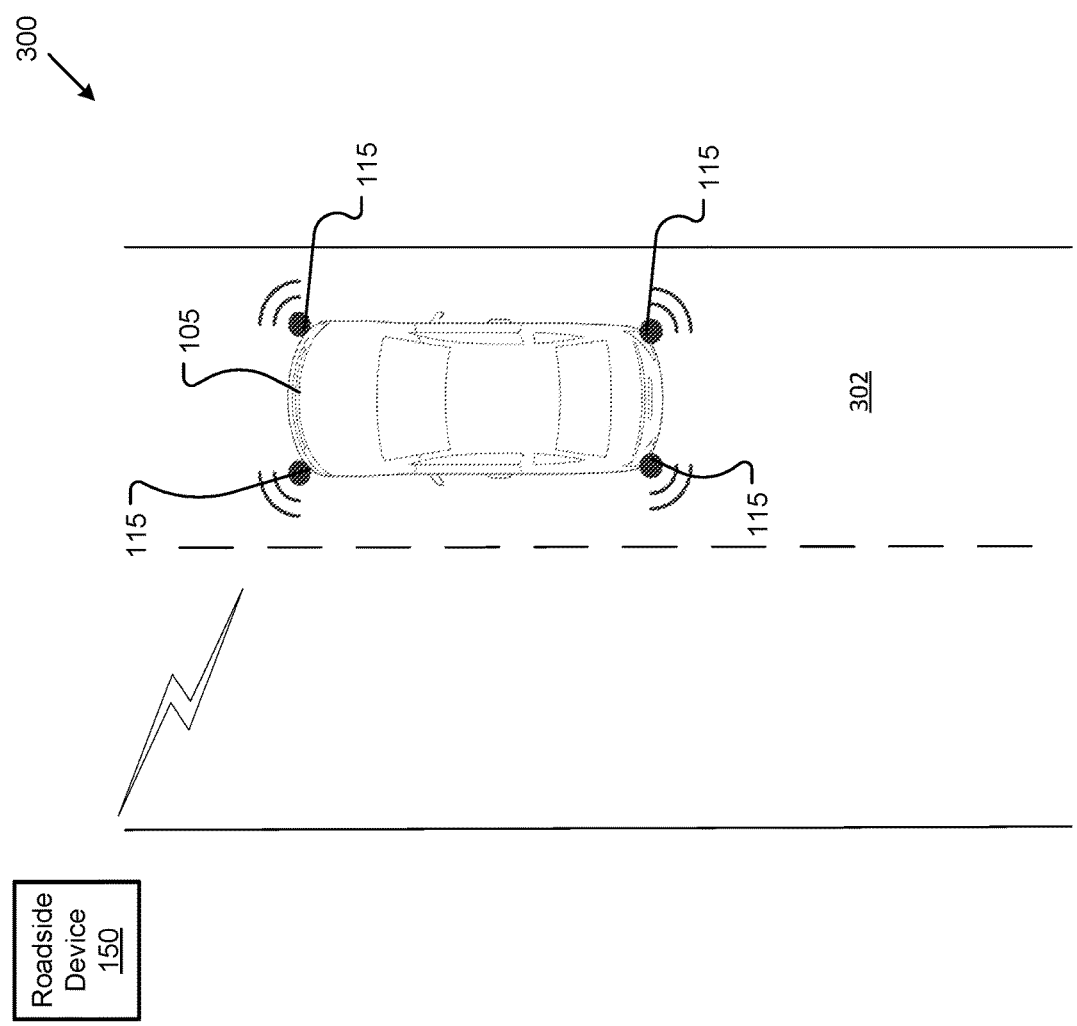
FIG. 3 is an example diagram of an environment for determining a location correction adjustment based on a fixed location of the roadside device.

FIG. 3 illustrates an example environment 300 including a vehicle 105 traversing a roadway 302. As shown, a roadside device 150 can be located along the roadway 302. It is to be understood that a location of the roadside device 150 may vary. For example, the roadside device 150 may be located on either side of the roadway 302. In an example implementation, the roadside device 150 may be located within a signalized intersection. The roadside device 150 has a fixed, i.e., non-moving or stationary, location that is an absolute location of the roadside device 150 defined with respect to earth's fixed coordinate system, i.e., geo-coordinates specifying a latitude and a longitude. The roadside device 150 can store data specifying its fixed location, i.e., geo-coordinates (latitude and longitude coordinates). As discussed in greater detail below, the vehicle 105 can determine a location correction adjustment using the fixed location of the roadside device 150.

As the vehicle 105 traverses the roadway 302, the vehicle 105 may establish a communication link with the roadside device 150. For example, the vehicle 105 may establish the communication link with the roadside device 150 when the vehicle 105 is within a communication distance range of the roadside device 150. The communication distance range is determined by the type of communication mechanisms and/or communication network used to establish the communication link.

The vehicle 105 and the roadside device 150 may each have a respective credentials for authentication purposes. In an example implementation, the vehicle 105 and the roadside device 150 may each include a V2X certificate, e.g., a conventional authentication certificate, for authentication. A V2X certificate can be issued to the vehicle 105 and the roadside device 150 by a governing agency. A V2X certificate can be used by each entity, e.g., the vehicle 105 and the roadside device 150, to validate an identify of the entity attempting to communicate with it. The vehicle 105 and/or the roadside device 150 can initially detect one another when the vehicle 105 enters the communication distance range of the roadside device 150. In an example implementation, the vehicle 105 includes multiple UWB sensors 115 located around the vehicle 105. The UWB sensors 115 can detect a presence of a UWB signal transmitted by the communication module 240 of the roadside device 150 once the vehicle 105 is within the communication distance range. According to an established communication protocol, the roadside device 150 and/or the vehicle 105 can authenticate themselves using the V2X certificates. In an example implementation, the communication link may be authenticated and securely established using a public key infrastructure (PKI) protocol.

Figure 4:
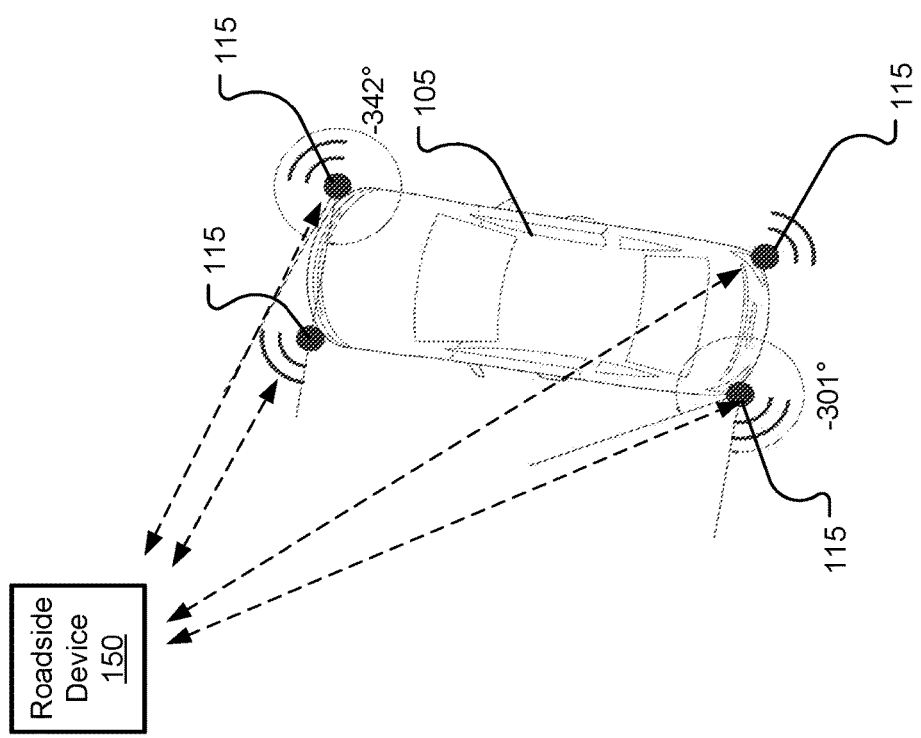
FIG. 4 is another example diagram of an environment for determining a location correction adjustment based on a fixed location of the roadside device.

Referring to FIG. 4, the vehicle 105 computer 110 can determine a location correction adjustment based on the fixed location of the roadside device 150, a determined location of the vehicle 105 based on the fixed location, and an assumed location of the vehicle 105, e.g., GPS location from the navigation system 155. The location correction adjustment can be used to adjust the assumed location of the vehicle 105. The location correction adjustment can be defined as a difference between the assumed location of the vehicle 105 and the determined location of the vehicle 105 based on the fixed location of the roadside device 150.

After the communication link is established with the roadside device 150, the vehicle 105 computer 110 can determine the vehicle 105 location with respect to the roadside device 150. The vehicle 105 computer 110 can initialize a ranging operation to calculate distances between the vehicle 105 sensors 115 and the roadside device 150 via one or more localization measurements. A ranging operation can be defined as the computer 110 calculating a distance between one or more vehicle 105 sensors 115 and the roadside device 150. As shown, in FIG. 4, the computer 110 causes the sensors 115 to transmit radio frequency (RF)

signals, such as UWB signals, and detect returned RF signals from the roadside device 150 during the ranging operation. The computer 110 can calculate the distance between the various sensors 115 and the roadside device 150 during the ranging operation by using at least one of an angle-of-arrival (AoA) measurement, a time-of-flight (ToF) measurement, and/or an angle-of-departure (AoD) measurement. For example, during a ToF measurement, the computer 110 calculates the distance based on a time measurement between transmission of an RF signal and its return to the sensor 115. In another example, during the AoA measurement, the computer 110 can localize the vehicle 105 relative to the roadside device 150 by determining a direction of propagation of an RF signal incident on one or more vehicle 105 sensors 115 and measuring a time distance of arrival between the RF signal at various vehicle 105 sensors 115. In this example, the RF signals may be transmitted by the roadside device 150.

The computer 110 can determine a vehicle location via a triangulation technique. The computer 110 can determine the vehicle location by applying one or more triangulation models to the calculated distances to estimate a location of the vehicle 105. The vehicle 105 computer 110 can determine a vehicle orientation based on internal compass data for the vehicle 105 from an internal compass sensor 115. The measured distance can be defined as each sensor's 115 distance to the roadside device 150, e.g., determined according to techniques mentioned above, and the internal compass data can provide the orientation of the vehicle 105 relative to geographic cardinal directions, e.g., a vehicle heading relative to true north.

For example, as shown in FIG. 4, the computer 110 may determine that the front passenger-side UWB sensor 115 is oriented at an angle of negative three hundred and forty-two degrees)(–342° with respect to the roadside device 150 and the rear driver-side UWB sensor 115 is oriented at an angle of negative three hundred and one degrees)(–301° with respect to the roadside device 150 using the techniques described above. The computer 110 can also use one or more triangulation techniques to determine the vehicle orientation. For example, the computer 110 can apply one or more conventional triangulation techniques to each sensor's 115 determined distance to the roadside device 150. While described within context of the UWB sensors 115, it is to be understood that other RF sensors 115 can be used to accomplish the techniques described herein.

The computer 110 can calculate the vehicle 105 location based on the calculated distance data and the vehicle orientation. The computer 110 can calculate the vehicle 105 location by determining a difference between the fixed location of the roadside device 150 and the calculated distance data and the vehicle orientation to determine location coordinates of the vehicle 105 relative to the fixed location.

The computer 110 can determine the location correction adjustment by calculating a difference between assumed location coordinates and the determined coordinates relative to the fixed location. The computer 110 can provide the location correction adjustment to the navigation system 155 to compensate for the difference between the assumed location coordinates and the determined coordinates. In some implementations, the location correction adjustment can be applied to generated LIDAR point maps used by the vehicle 105 for navigation.

In some instances, the roadside device 150 may be transmitting an incorrect fixed location or UWB range signals. In these instances, other vehicles that previously communicated with the roadside device 150 may have determined that the roadside device 150 is transmitting incorrect data. For example, data, e.g., determined location data calculated by the specific roadside device 150, received from other vehicles may be compared with ground truth data at the server 145. If the data received from the other vehicles does not match the data for the roadside devices 150 stored in the server 145, the server 145 can determine that the roadside device 150 is transmitting incorrect data. These vehicles may generate a notification indicating the roadside device 150 is transmitting incorrect data. The notification can be uploaded to the server 145 via the network 135 or the vehicle 105 via vehicle-to-vehicle communications. Based on the notification, the vehicle 105 computer 110 can add the certificate, e.g., V2X certificate, of the roadside device 150 to a certificate revocation list (CRL) maintained by the computer 110. Thus, if the vehicle 105 enters the communication distance range of the roadside device 105, the computer 110 can ignore or reject signals transmitted by the roadside device 150.

Figure 5:
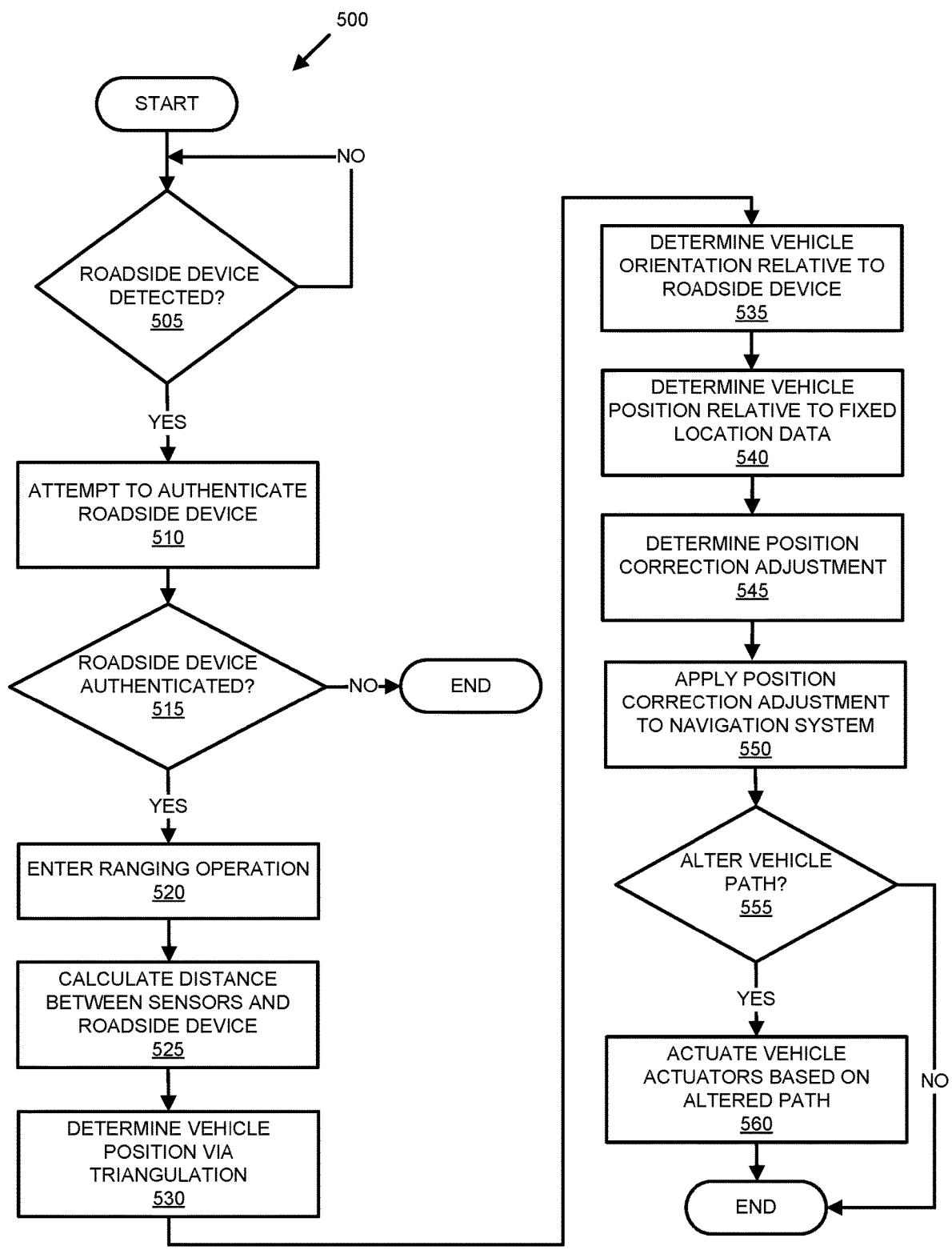
FIG. 5 is a flow diagram illustrating an example process for determining a location correction adjustment based on a fixed location of the roadside device.

FIG. 5 illustrates an example flow diagram of a process 500 for determining a location correction adjustment. Blocks of the process 500 can be executed by the computer 110 of the vehicle 105. The process 500 begins at block 505 in which a determination is made whether a roadside device 150 has been detected. For example, as the vehicle 105 is traveling through an environment, e.g., on a roadway 302, the vehicle 105 computer 110 can detect radio frequency signals, such as UWB signals, transmitted by the roadside device 150. If the roadside device 150 has not been detected, the process 500 returns to block 505.

If the roadside device 150 is detected, the computer 110 attempts to authenticate the roadside device 150 at block 510. In an example implementation, the roadside device 150 provides its V2X certificate to the vehicle 105 computer 110. The computer 110 can then validate a digital signature associated with the V2X certificate. As discussed above, the roadside device 150 can be authenticated via the PKI protocol. At block 515, a determination is made whether the roadside device 150 is authenticated. If the roadside device 150 is not authenticated, the process 500 ends.

Otherwise, the computer 110 causes the sensors 115 to enter a ranging operation at block 520. As discussed above, the computer 110 causes the sensors 115 to transmit radio frequency (RF) signals and detect returned RF signals from the roadside device 150 during the ranging operation. At block 525, the computer 110 calculates the distance between the various sensors 115 and the roadside device 150 based on the signals measured during the ranging operation. For example, the computer 110 calculates the distance via an angle-of-arrival (AoA) measurement, a time-of-flight (ToF) measurement, an angle-of-departure (AoD) measurement, or the like.

At block 530, the computer 110 determines a vehicle location of the vehicle 105 relative to the fixed location based on the calculated distances. At block 535, the computer 110 determines a vehicle orientation relative to the roadside device 150. The computer 110 can determine the vehicle orientation by applying one or more conventional triangulation techniques to the calculated distances to determine the vehicle orientation. The computer 110 can use the internal compass data and the measured distance to determine relative angles of the UWB sensors 115 with respect to the roadside device 150.

At block 540, the location of the vehicle 105 relative to the fixed location is calculated based on the calculated distance and the vehicle orientation. The computer 110 calculates the vehicle 105 location by determining a difference between the fixed location of the roadside device 150 and the calculated distance data and the vehicle orientation to determine location coordinates of the vehicle 105 relative to the fixed location. At block 545, the computer 110 determines the location correction adjustment by calculating a difference between the received location coordinates and the determined coordinates relative to the fixed location. At block 550, the computer applies the location correction adjustment to the vehicle 105 navigation system 155.

At block 555, a determination is made whether to alter a vehicle path based on the location correction adjustment. The computer 110 may determine that a current vehicle path should be altered based on the location correction adjustment applied to the vehicle 105 navigation system 155. For example, if the location correction is greater than a predetermined threshold, the computer 110 can determine that the vehicle path should be altered. If the vehicle path should be altered, one or more vehicle actuators are actuated to alter the vehicle path at block 560. The process 500 then ends. If the vehicle path is not to be altered, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to cause the processor to:
   detect a roadside device via at least one sensor of a vehicle;
   determine a location of the vehicle relative to a fixed location of the roadside device;
   determine a location correction adjustment for the vehicle, wherein the location correction adjustment comprises a difference between an assumed location of the vehicle and the determined location of the vehicle, wherein the assumed location is obtained from a navigation system of the vehicle;
   authenticate the roadside device with a V2X certificate of the roadside device;
   reject signals transmitted by the roadside device when the V2X certificate of the roadside device is included in a certificate revocation list; wherein the certificate revocation list is received from a server that has included the V2X certificate on the certificate revocation based on determining that the roadside device is transmitting incorrect data based on a comparison of the determined location of the vehicle with ground truth data; and
   adjust the assumed location based on the location correction adjustment when the signals transmitted by the roadside device are not ignored or rejected because the roadside device is included in the certificate revocation list.

2. The system of claim 1, wherein the processor is further programmed to: alter a vehicle path of the vehicle based on the location correction adjustment.

3. The system of claim 2, wherein the processor is further programmed to: actuate one or more vehicle actuators to alter the vehicle path.

4. The system of claim 1, wherein the processor is further programmed to: calculate a distance between the roadside device and the at least one vehicle sensor by measuring an ultra-wideband (UWB) signal in at least one vehicle sensor, wherein the UWB signal is transmitted from the roadside device.

5. The system of claim 4, wherein the processor is further programmed to: calculate the distance between the roadside device and the at least one vehicle sensor based on at least one of an angle-of-arrival (AoA) measurement, an angle-of-departure (AoD) measurement, or a time-of-flight (ToF) measurement of the UWB signal.

6. The system of claim 4, wherein the processor is further programmed to: determine the location of the vehicle by applying a triangulation model to the calculated distance between the roadside device and the at least one vehicle sensor.

7. The system of claim 6, wherein the processor is further programmed to:
   determine a vehicle orientation relative to the roadside device; and
   determine the location of the vehicle based on the calculated distance with respect to the fixed location of the roadside device and the vehicle orientation.

8. The system of claim 1, wherein the processor is further programmed to: authenticate the roadside device after detection of the roadside device.

9. The system of claim 1, wherein the processor is further programmed to: authenticate the V2X certificate via a public key infrastructure (PKI) protocol.

10. A method comprising:
    detecting, via computer, a roadside device via at least one vehicle sensor;
    determining a location of a vehicle relative to a fixed location of the roadside device;
    determining a location correction adjustment, wherein the location correction adjustment comprises a difference between an assumed location of the vehicle and the determined location of the vehicle, wherein the assumed location is obtained from a navigation system of the vehicle;
    authenticating the roadside device with a V2X certificate of the roadside device;
    rejecting signals transmitted by the roadside device when the V2X certificate of the roadside device is included in a certificate revocation list; wherein the certificate revocation list is received from a server that has included the V2X certificate on the certificate revocation based on determining that the roadside device is transmitting incorrect data based on a comparison of the determined location of the vehicle with ground truth data; and
    adjusting the assumed location based on the location correction adjustment when the signals transmitted by the roadside device are not ignored or rejected because the roadside device is included in the certificate revocation list.

11. The method of claim 10, further comprising: altering a vehicle path of the vehicle based on the location correction adjustment.

12. The method of claim 11, further comprising: actuating one or more vehicle actuators to alter the vehicle path.

13. The method of claim 10, further comprising: calculating a distance between the roadside device and the at least one vehicle sensor by measuring an ultra-wideband (UWB) signal in at least one vehicle sensor, wherein the UWB signal is transmitted from the roadside device.

14. The method of claim 13, further comprising: calculating the distance between the roadside device and the at least one vehicle sensor based on at least one of angle-of-arrival (AoA) measurement, an angle-of-departure (AoD) measurement, or a time-of-flight (ToF) measurement of the UWB signal.

15. The method of claim 13, further comprising: determining the location of the vehicle by applying a triangulation model to the calculated distance between the roadside device and the at least one vehicle sensor.

16. The method of claim 15, further comprising:
    determining a vehicle orientation relative to the roadside device; and
    determining the location of the vehicle based on the calculated distance with respect to the fixed location of the roadside device and the vehicle orientation.

* * * * *